United States Patent

[11] 3,583,705

| [72] | Inventor | Reynolds Hill<br>4610 Gaines Road, Tampa, Fla. 33611 |
|---|---|---|
| [21] | Appl. No. | 821,331 |
| [22] | Filed | May 2, 1969 |
| [45] | Patented | June 8, 1971 |

[54] ANIMAL TRAP GAME
10 Claims, 11 Drawing Figs.

[52] U.S. Cl................................................ 273/130R,
273/1R
[51] Int. Cl............................................... A63f 3/00
[50] Field of Search........................................ 273/1, 130,
139, 140; 43/61

[56] References Cited
UNITED STATES PATENTS

| 107,647 | 9/1870 | Bachman...................... | 43/61 |
| 428,966 | 5/1890 | Shaw........................... | 43/61 |
| 1,885,260 | 11/1932 | Hoglind...................... | 273/1 |
| 3,168,311 | 2/1965 | Sinden......................... | 273/1 |

Primary Examiner—Delbert B. Lowe
Attorney—Berman, Davidson and Berman

ABSTRACT: An amusement device having a boxlike structure with a vertically sliding gate carried by a trip rod adjacent one end of the boxlike structure. A ball-like member is swivelly suspended within the structure and carries a plurality of removable pegs in slots. Displacement of the ball-like member releases the gate for downward closing movement. A game rod is provided for insertion into the box structure to remove the pegs from the slots in the ball-like member. Dice and a game board are provided.

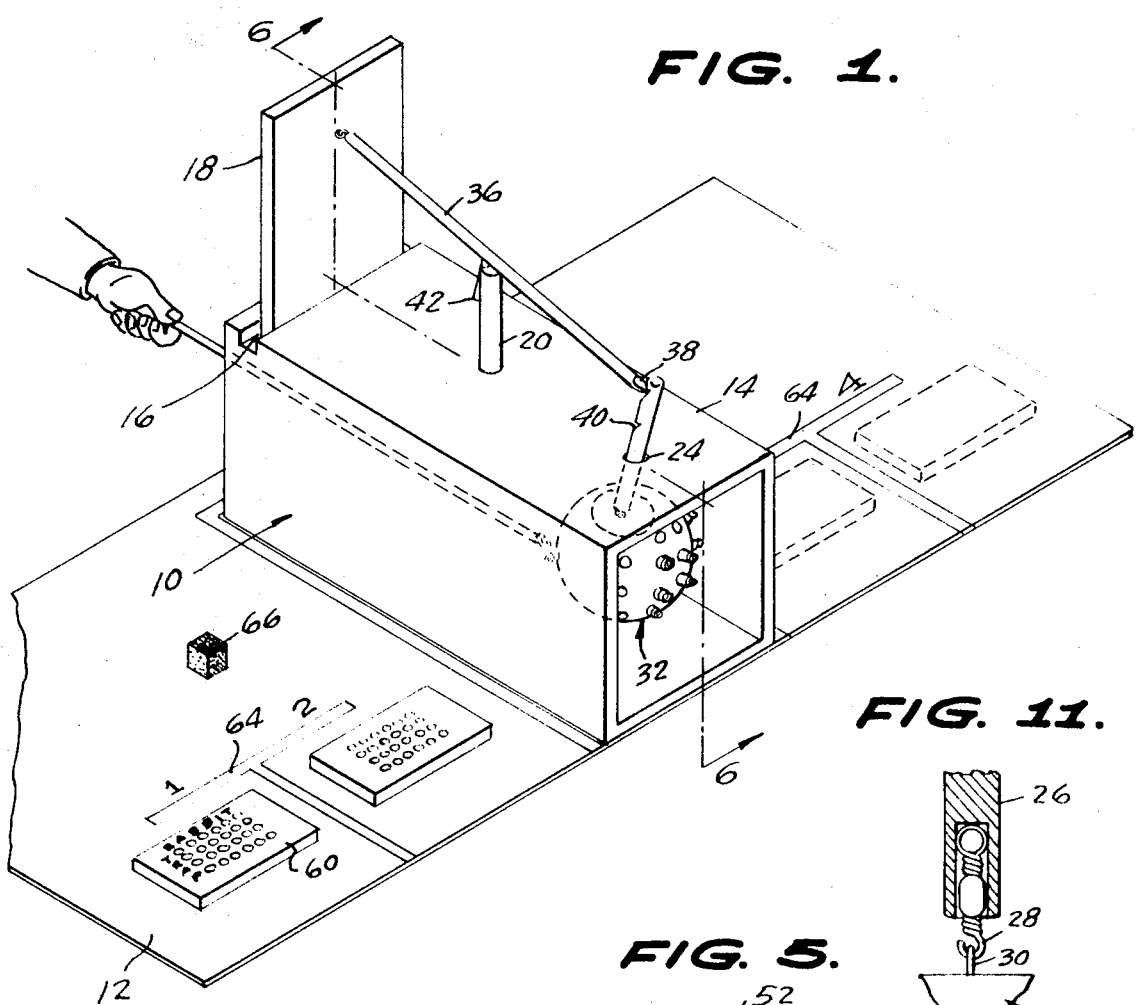
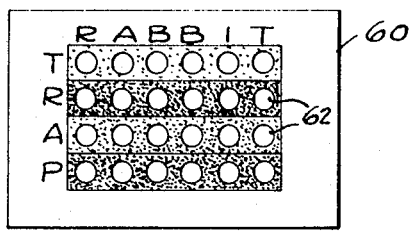
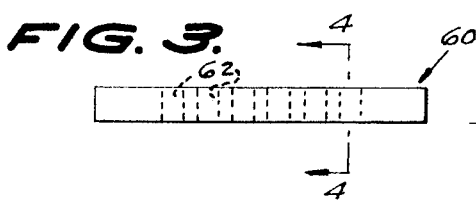
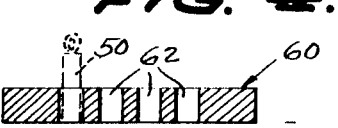
INVENTOR.
REYNOLDS HILL,

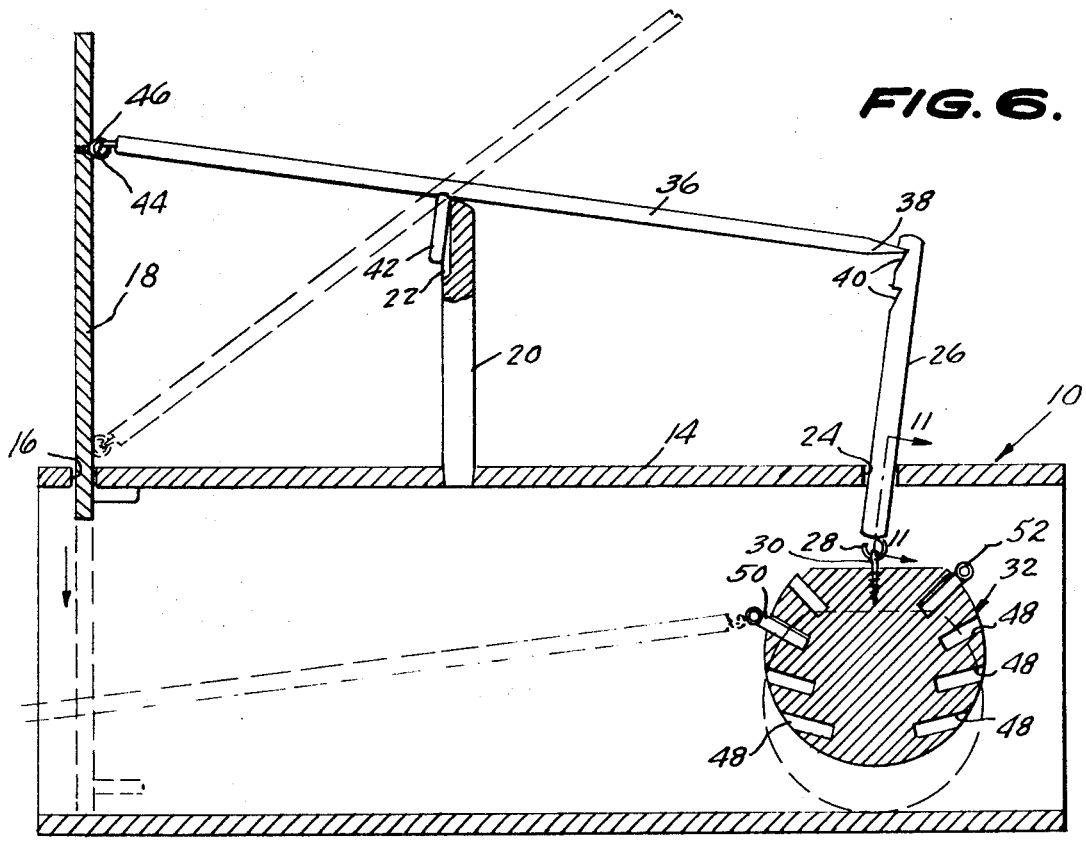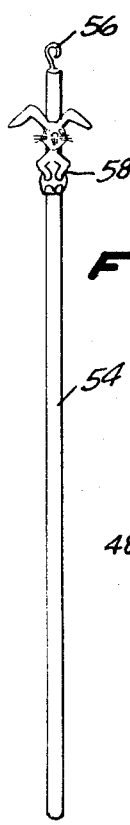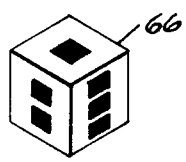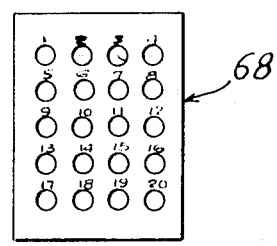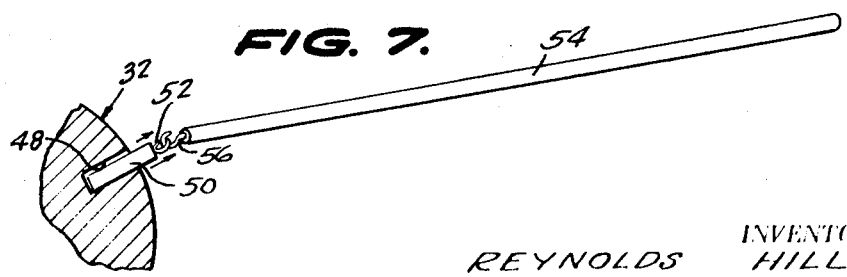

3,583,705

ANIMAL TRAP GAME

The present invention relates to an amusement device, and more particularly to an amusement device including a game board and a boxlike structure or cage of rectangular form with a vertically sliding door adjacent one end thereof to completely close off the trap or cagelike structure when a swively disposed ball within the structure releases a trip rod means and the vertically sliding door.

It is another object of the present invention to provide an animal trap type amusement device which is both entertaining and educational.

It is still a further object of the present invention to provide an animal trap type of game or amusement device which has many educational qualities existing through the use of colors, numbers and word letters, and which is interesting to play and involves skill but always has an element of chance present.

Various other objects and advantages of the present invention will be readily apparent from the following detailed description when considered in connection with the accompanying drawings forming a part thereof, and in which:

FIG. 1 is a perspective view illustrating the animal trap game embodying the present invention.

FIG. 2 is a view of one of the scoring means embodied in the present invention.

FIG. 3 is a side view of the scoring means illustrated in FIG. 2.

FIG. 4 is a section taken along the line 4—4 of FIG. 3.

FIG. 5 is a view of a peg member embodied in the present invention.

FIG. 6 is a section taken along the line 6—6 of FIG. 1.

FIG. 7 is a detail view of the rod member used in the present invention to remove a peg from the ball means embodied in the invention.

FIG. 8 is a view of the rod member shown in FIG. 7 with a rabbit figurine thereon.

FIG. 9 is an illustration of the die member embodied in the present invention.

FIG. 10 is an illustration of another scoring means embodied in the present invention, and FIG. 11 is a section taken along line 11—11 of FIG. 6.

Referring to the drawings, the reference numeral 10 generally designates the animal trap game of the present invention which is provided with a game board 12 of flat rectangular configuration. The game is provided with a boxlike structure or cage, or trap 14, as best seen in FIGS. 1 and 6, which has opposite vertical sidewalls and oppositely disposed top and bottom extending in a horizontal direction with the opposite ends of the structure being open. The top of the box structure is provided with a slot 16, extending transversely thereof, adjacent one end of the structure. The slot 16 is adapted to receive a vertically sliding door 18. The top of the trap is also provided with a vertical dowel peg or member 20 secured therein and disposed at approximately the middle of the boxlike structure, as best seen in FIGS. 1 and 6. The peg or support 20 is provided with a slot or notch 22 in the front thereof. Adjacent the rear of the boxlike structure is a circular aperture or opening 24 in the top thereof, and the dowel peg 20 and the circular opening 24 are disposed in alignment with each other and approximately on the centerline of the top of the box, as best seen in FIG. 1. A notched ball suspension rod or support 26 extends through the aperture 24 and is provided with a hook 28 on the bottom thereof for receiving the eye 30 which is threaded into the ball member 32.

A trip rod 36 which is made of a dowel stick is adapted to rest on the peg 20 in the top of the box structure. The trip rod is provided with a pointed rear end 38 adapted to fit into the notches 40 in the ball suspension rod 26. The trip rod is also provided with a dowel peg 42 adapted to fit in the slot 22 in the peg 20. The front end of the trip rod 36 is provided with a hook 44 adapted to extend through the eye 46 threaded into the rear of sliding door 18.

The ball member 32 is provided with a plurality of cylindrical bores or recesses or slots 48 drilled therein. The slots 48 are disposed in the ball 32, as best seen in FIG. 6, so that they are inclined in an upward direction and are adapted to receive dowel pegs 50 therein so that the pegs will remain in the slots unless they are pulled therefrom. The dowel pegs 50 are of various colors and the holes or slots 48 in ball 32 are also colored, and the colored pegs are inserted into the holes or slots 48 which are of the same color as the pegs. All of the pegs 50 are provided with eyes 52 in their outer ends.

A game rod 54 having a hook 56 on one end thereof is provided for inserting through the front open end of the boxlike structure in order to attempt to fasten its hook 56 to the eye or loop 52 of a peg 50 to slide it out from its slot 48 in the ball member 32. The rod 54 may have a rabbit figurine 58 thereon.

The game board 12 is provided with a plurality of scoring members 60 which are substantially flat blocks having a plurality of vertical circular slots or recesses 62 therein adapted to receive the removed pegs 50 as best seen in FIG. 4. Referring to FIG. 2, it will be seen that the scoring member 60 therein is provided with rows of slots 62 having different colors. Also, the rows of slots are provided with the indicia "Rabbit" adjacent the top row of the slots and the indicia "-Trap" adjacent the left side of the scoring member. The game board 12 is also provided with indicia 64 in the form of a "T" on opposite ends thereof so as to provide certain sections on the game board for receiving at least four scoring members 60 thereon, as best seen in FIG. 1.

The game of the present invention is further provided with a die or cube, as best seen in FIGS. 1 and 9, and indicated as 66. The cube 66 is provided with different colors on its sides which match the colors on the different colored pegs.

Referring to FIG. 10, there is illustrated therein another type of scoring member 68 similar to that described in connection with FIG. 2 except that the slots therein are numbered in consecutive order, and the scoring member does not have the lettered indicia thereon.

In playing the game of the present invention, the Animal Trap device is set into the position shown in FIGS. 1 and 6, with the ball 32 swively disposed on the hook 28 and freely suspended within the boxlike structure with the ball suspension rod 26 extending through the opening 24 and maintained in a suspended position by the pointed end 38 of the trip rod 36 being disposed in one of the notches 40 thereof. The trip rod 36 is supported on and balanced on the dowel peg 20 with the dowel peg 42 of the trip rod 36 being disposed in the notch or slot 22 of the dowel peg 20.

The trip rod 36 will thus maintain the sliding door 18 in the raised vertically disposed position so that the game rod 54 can be inserted through the open front end of the boxlike structure, as illustrated in FIG. 1, in order to attempt to remove the dowel pegs 50 from their slots by inserting the hook 56 through the eyes or loops 52 of the pegs. 50.

The object of the game is to remove as many as possible of the pegs 50 from the ball 32 by using the game rod 54 without inadvertently pulling the ball 32 so as to cause the pointed end 38 of the trip rod to be released from the notch 40 to thereby cause the trip rod 36 to fall off of the peg 20 and thus cause the vertically sliding door 18 to be tripped and close and fall down into the box structure.

A person playing the game would throw the die 66, and if his playing color came up he would attempt to remove a corresponding colored peg 50 from the ball 32 and to remove as many pegs 50 as corresponding marks on the die come up when he throws it. When the player has successfully removed a peg or game piece 50 from the ball or game piece holding means 32 without causing the trip rod 36 or trip means 36, 20 and 26 to set off the trap, he places the removed peg 50 into the scoring member 60 as illustrated in FIG. 2, and continues to remove pegs and place them in the colored rows of slots until he spells out the name of the game across and down, that is, "Rabbit Trap."

With respect to the scoring member shown in FIG. 10, the object of the game is to remove enough pegs to fill the player's scoring member first.

Thus, it is apparent from the foregoing description that the present invention provides a novel amusement game that is provided with a swivel or rotating or suspended ball therein and having a plurality of slots therein to receive removable colored pegs and a game rod that is adapted to engage the pegs and remove them without inadvertently tripping or releasing the trap door or closure means in the boxlike structure.

Inasmuch as various changes may be made in the relative arrangement and location of the parts without departing from the invention, it is not meant to limit the scope of the invention except by the following claims:

What I claim is:

1. An amusement device comprising a boxlike structure having an open end and provided with slot means in the top thereof for receiving a trap door, a first support carried by the top and spaced rearwardly of said slot means, the top being provided with an aperture spaced rearwardly of said first support means, a vertical sliding trap door disposed in said slot means, a second support extending through said aperture into said structure, a swively disposed game piece holder positioned inside said structure and suspended from said second support, trip means on said first support operatively connecting said game piece holder to said trap door whereby substantial movement of said holder will activate said trip means and result in closing movement of said trap door, a plurality of removable game pieces disposed in said game piece holder, and game rod means adapted to be inserted into said structure and connected to said game pieces to remove them from said game piece holder.

2. The device of claim 1 wherein said game piece holder includes a ball with said game pieces disposed in a plurality of cylindrical slots disposed in its surface at an upwardly inclined angle.

3. The device of claim 2 wherein said removable game pieces comprise pegs disposed in said ball slots with means secured thereto for connection to said game rod means.

4. The device of claim 3 wherein said trip means is an elongated rod with fastening means on one end connecting said rod to said trap door, the opposite end of said rod being provided with a pointed configuration.

5. The device of claim 4 wherein said second support is a rod with at least one notch to receive said pointed end of said trip means.

6. The device of claim 5 wherein a scoring member is provided comprising a flat block with a plurality of slots therein for receiving said removable pegs and said block has scoring indicia thereon.

7. The device of claim 6 wherein said ball is suspended from said second support by a hook and loop arrangement.

8. The device of claim 7 and a game board supporting said boxlike structure.

9. An amusement device comprising a hollow structure with an open end, said structure having a top provided with an opening, closure means positioned within said opening and movable from an open position to a position closing said structure, elongated trip means mounted on said structure and having one end connected to said closure means, a game piece holder positioned within said structure and suspended from the other end of said trip means, said trip means being activated upon substantial movement of said holder to permit said closure means to move from its open position to its closed position, and a plurality of game pieces removably carried by said game piece holder.

10. An amusement device comprising a hollow structure with an open end, said structure having a top provided with an opening, closure means slidably positioned within said opening and movable from an open position to a position closing said structure, elongated trip means mounted on said structure and having one end connected to said closure means, a game piece holder positioned within said structure and suspended from the other end of said trip means, said trip means being activated upon substantial movement of said holder to permit said closure means to move from its open position to its closed position, a plurality of game pieces removably carried by said game piece holder, and game piece removing means adapted to be inserted into said structure and connected to said game pieces to remove them from said game piece holder.